United States Patent
Doshi

(10) Patent No.: US 9,524,198 B2
(45) Date of Patent: Dec. 20, 2016

(54) MESSAGING BETWEEN WEB APPLICATIONS

(71) Applicant: Google Inc., Mountain View, CA (US)

(72) Inventor: Munjal Doshi, Sammamish, WA (US)

(73) Assignee: Google Inc., Mountain View, CA (US)

( * ) Notice: Subject to any disclaimer, the term of this patent is extended or adjusted under 35 U.S.C. 154(b) by 583 days.

(21) Appl. No.: 13/662,249

(22) Filed: Oct. 26, 2012

(65) Prior Publication Data

US 2014/0032707 A1 Jan. 30, 2014

Related U.S. Application Data

(60) Provisional application No. 61/676,740, filed on Jul. 27, 2012.

(51) Int. Cl.
*G06F 15/16* (2006.01)
*G06F 9/54* (2006.01)
*H04L 29/08* (2006.01)
*H04L 12/58* (2006.01)

(52) U.S. Cl.
CPC ............. *G06F 9/542* (2013.01); *H04L 51/00* (2013.01); *H04L 67/02* (2013.01)

(58) Field of Classification Search
CPC ................... H04L 51/00; H04L 51/04–51/06; H04L 51/12–51/14; H04L 67/00–67/02; H04L 67/22–67/26; G06F 9/54; G06F 9/542
USPC .................................................. 709/204–207
See application file for complete search history.

(56) References Cited

U.S. PATENT DOCUMENTS

| 7,200,390 B1 * | 4/2007 | Henager ............... H04W 8/245 |
| | | 455/412.1 |
| 7,340,714 B2 | 3/2008 | Upton |
| 7,685,265 B1 | 3/2010 | Nguyen et al. |
| 7,711,783 B1 * | 5/2010 | Violleau et al. .............. 709/206 |
| 7,979,807 B2 * | 7/2011 | Subramaniam ....... G06F 9/4443 |
| | | 715/743 |

(Continued)

FOREIGN PATENT DOCUMENTS

| WO | WO-2011/059396 | 5/2011 |
| WO | WO-2011/083177 | 7/2011 |

OTHER PUBLICATIONS

Gregg, "Web Notifications", W3C Editor's Draft, May 8, 2012, http://dev.w3.org/2006/webapi/WebNotifications/publish/Notifications.html.

*Primary Examiner* — David Lazaro
*Assistant Examiner* — Julian Chang
(74) *Attorney, Agent, or Firm* — McDermott Will & Emery LLP

(57) ABSTRACT

The disclosed subject matter relates to a system for messaging between applications, the system having one or more processors and a memory including instructions that, when executed by the one or more processors, cause the one or more processors to perform operations including receiving a message including an identifier associated with a web application having a subscription to receive selected events associated with a publisher operating on a data network. The operations also include receiving, from the publisher, an event notification of at least one of the selected events. The operations also include determining whether the web application is subscribed to receive the event notification. The operations also include transmitting, in a case where the web application is subscribed to receive the event notification, an indication of the event notification to the web application.

31 Claims, 6 Drawing Sheets

(56) References Cited

U.S. PATENT DOCUMENTS

| | | | |
|---|---|---|---|
| 7,987,246 B2* | 7/2011 | Tsuji | G06F 17/30902 709/203 |
| 8,331,963 B1* | 12/2012 | Lin | H04L 67/1095 455/435.1 |
| 9,213,850 B2* | 12/2015 | Barton | G06F 21/604 |
| 2003/0101235 A1* | 5/2003 | Zhang | H04L 51/04 709/218 |
| 2004/0176128 A1* | 9/2004 | Grabelsky et al. | 455/553.1 |
| 2004/0205698 A1* | 10/2004 | Schliesmann | H04N 5/44513 717/106 |
| 2004/0255302 A1 | 12/2004 | Trossen | |
| 2005/0074098 A1* | 4/2005 | O'Brien | H04M 3/537 379/88.12 |
| 2005/0138183 A1* | 6/2005 | O'Rourke | H04L 67/02 709/228 |
| 2007/0162582 A1* | 7/2007 | Belali | G06F 1/3209 709/223 |
| 2008/0040441 A1* | 2/2008 | Maes | H04L 12/581 709/207 |
| 2008/0059597 A1* | 3/2008 | Blevins et al. | 709/207 |
| 2008/0256553 A1* | 10/2008 | Cullen | 719/313 |
| 2009/0049190 A1* | 2/2009 | Jiang et al. | 709/238 |
| 2009/0144359 A1* | 6/2009 | Karlsen | H04L 67/26 709/203 |
| 2009/0228584 A1 | 9/2009 | Maes et al. | |
| 2010/0071046 A1 | 3/2010 | Seethana et al. | |
| 2010/0100526 A1* | 4/2010 | Choi | G06Q 10/107 707/609 |
| 2010/0162260 A1* | 6/2010 | Ibrahim | G06F 9/505 718/105 |
| 2010/0216434 A1* | 8/2010 | Marcellino et al. | 455/412.2 |
| 2010/0306312 A1* | 12/2010 | Ryu | G06F 9/4445 709/203 |
| 2011/0071889 A1 | 3/2011 | Erhart et al. | |
| 2011/0164107 A1* | 7/2011 | Tian | H04L 12/1822 348/14.08 |
| 2011/0173681 A1* | 7/2011 | Qureshi | H04L 63/0823 726/4 |
| 2011/0224807 A1* | 9/2011 | Murakami | H04L 12/2827 700/21 |
| 2011/0320550 A1* | 12/2011 | Lawson | G06F 9/542 709/206 |
| 2011/0321062 A1* | 12/2011 | Pope et al. | 719/318 |
| 2012/0173610 A1* | 7/2012 | Bleau et al. | 709/203 |
| 2012/0173626 A1* | 7/2012 | Reis et al. | 709/204 |
| 2012/0198268 A1* | 8/2012 | Qureshi | G06F 11/1443 714/4.1 |
| 2012/0254963 A1* | 10/2012 | Sancheti et al. | 726/7 |
| 2012/0290953 A1* | 11/2012 | Russell et al. | 715/758 |
| 2012/0303774 A1* | 11/2012 | Wilson | H04L 67/26 709/223 |
| 2012/0307656 A1* | 12/2012 | Vyrros et al. | 370/252 |
| 2013/0040669 A1* | 2/2013 | Bengtsson | H04L 51/38 455/466 |
| 2013/0084896 A1* | 4/2013 | Barkie et al. | 455/466 |
| 2013/0132573 A1* | 5/2013 | Lindblom | H04L 51/24 709/225 |
| 2013/0212203 A1* | 8/2013 | Park | H04L 12/5895 709/206 |
| 2013/0227030 A1* | 8/2013 | Eidelson | H04L 67/1095 709/206 |
| 2013/0239231 A1* | 9/2013 | Korycki | H04L 67/02 726/29 |
| 2013/0252585 A1* | 9/2013 | Moshir | G06F 21/35 455/411 |
| 2013/0254314 A1* | 9/2013 | Chow | 709/206 |
| 2013/0268641 A1* | 10/2013 | Colbert | H04L 67/26 709/223 |
| 2013/0325960 A1* | 12/2013 | Agarwal | H04L 65/40 709/204 |
| 2013/0326046 A1* | 12/2013 | Chan | G06F 9/4443 709/224 |
| 2013/0332976 A1* | 12/2013 | Shenker et al. | 725/114 |
| 2013/0336310 A1* | 12/2013 | Laasik | H04L 29/06183 370/352 |
| 2014/0007213 A1* | 1/2014 | Sanin et al. | 726/9 |
| 2014/0026203 A1* | 1/2014 | Ho | 726/9 |
| 2014/0032707 A1* | 1/2014 | Doshi | 709/217 |
| 2014/0047072 A1* | 2/2014 | Shuster | H04L 65/4069 709/219 |
| 2014/0047323 A1* | 2/2014 | Bourke | G06F 17/2247 715/234 |
| 2014/0047360 A1* | 2/2014 | Kay | G06F 9/4443 715/760 |
| 2014/0052617 A1* | 2/2014 | Chawla | G06Q 10/10 705/39 |
| 2014/0068421 A1* | 3/2014 | Bourke | G06F 8/38 715/235 |
| 2014/0214967 A1* | 7/2014 | Baba et al. | 709/205 |
| 2014/0304590 A1* | 10/2014 | Zhang | G06F 17/227 715/234 |
| 2015/0019659 A1* | 1/2015 | Eidelson | H04L 51/32 709/206 |
| 2015/0113172 A1* | 4/2015 | Johnson et al. | 709/245 |
| 2015/0222512 A1* | 8/2015 | Kay | G06F 11/30 709/224 |
| 2015/0222664 A1* | 8/2015 | Battre | H04L 63/20 726/1 |
| 2015/0244837 A1* | 8/2015 | Jadhav | H04L 12/6418 709/203 |

* cited by examiner

MESSAGING BETWEEN WEB APPLICATIONS

CROSS-REFERENCE TO RELATED APPLICATIONS

The present application claims the benefit of U.S. Provisional Appl. No. 61/676,740, filed Jul. 27, 2012, entitled "MESSAGING BETWEEN WEB APPLICATIONS," which is hereby incorporated by reference in its entirety for all purposes.

FIELD

The present description relates generally to notification systems, and more particularly, but not exclusively, to push notification systems for messaging between web applications.

BACKGROUND

A service website for an application typically send a notification to a user of the application to notify the user about potential updates that are available for the application. However, web notifications typically require a client to retrieve updated information on a network. That is, web applications typically employ polling mechanisms in order to retrieve the new data, such as a new e-mail message, from a server using Hypertext Transfer Protocol (HTTP) features (e.g., asynchronous Javascript and XML (AJAX) HTTP requests).

SUMMARY

The disclosed subject matter relates to a computer-implemented method for messaging between applications, the method including receiving a message including an identifier associated with a subscriber having a subscription to receive selected events associated with a publisher operating on a data network. The method also includes receiving, from the publisher, an event notification of at least one of the selected events. The method also includes determining whether the subscriber is subscribed to receive the event notification. The method also includes transmitting, in a case where the subscriber is subscribed to receive the event notification, an indication of the event notification to the subscriber.

The disclosed subject matter relates to a system for messaging between applications, the system having one or more processors and a memory including instructions that, when executed by the one or more processors, cause the one or more processors to perform operations including receiving a message including an identifier associated with a subscriber web application having a subscription to receive selected events associated with a publisher operating on a data network. The steps also include receiving, from the publisher, an event notification of at least one of the selected events. The steps also include determining whether the subscriber web application is subscribed to receive the event notification. The steps further include transmitting, in a case where the subscriber web application is subscribed to receive the event notification, an indication of the event notification to the subscriber web application.

The disclosed subject matter also relates to a non-transitory machine readable medium embodying instructions that, when executed by a machine, allow the machine to perform a method for messaging between applications, the method including receiving a message including an identifier associated with a subscriber having a subscription to receive selected events associated with a publisher operating on a data network. The method also includes receiving, from the publisher, an event notification of at least one of the selected events. The method also includes determining whether the subscriber is subscribed to receive the event notification. The method also includes transmitting, in a case where the subscriber is subscribed to receive the event notification, an indication of the event notification to the subscriber.

The disclosed subject matter relates to an apparatus for messaging between applications, the apparatus including means for receiving a message including an identifier associated with a subscriber having a subscription to receive selected events associated with a publisher operating on a data network. The apparatus also includes means for receiving, from the publisher, an event notification of at least one of the selected events. The apparatus also includes means for determining whether the subscriber is subscribed to receive the event notification. The apparatus further includes means for transmitting, in a case where the subscriber is subscribed to receive the event notification, an indication of the event notification to the subscriber.

The disclosed subject matter also relates to a computer-implemented method for messaging between applications, the method including transmitting a message including an identifier associated with a subscriber web application subscribed to receive selected events associated with a publisher operating on a data network. The method also includes receiving an indication of an event notification associated with the publisher based on one or more subscriptions to the selected events. The method also includes determining whether one or more applications are subscribed to receive the event notification. The method also includes providing, in a case where the one or more applications are subscribed to receive the event notification, the indication of the event notification to the one or more applications.

The disclosed subject matter relates to a system for messaging between applications, the system having one or more processors and a memory including instructions that, when executed by the one or more processors, cause the one or more processors to perform operations including transmitting a message including an identifier associated with an application subscribed to receive selected events associated with a publisher operating on a data network. The steps also include receiving an indication of an event notification associated with the publisher based on one or more subscriptions to the selected events. The steps also include determining whether one or more applications are subscribed to receive the event notification. The steps further include providing, in a case where the one or more applications are subscribed to receive the event notification, the indication of the event notification to the one or more applications.

The disclosed subject matter also relates to a non-transitory machine readable medium embodying instructions that, when executed by a machine, allow the machine to perform a method for messaging between applications, the method including transmitting a message including an identifier associated with an application subscribed to receive selected events associated with a publisher operating on a data network. The method also includes receiving an indication of an event notification associated with the publisher based on one or more subscriptions to the selected events. The method also includes determining whether one or more applications are subscribed to receive the event notification.

The method also includes providing, in a case where the one or more applications are subscribed to receive the event notification, the indication of the event notification to the one or more applications.

The disclosed subject matter relates to an apparatus for messaging between applications, the apparatus including means for transmitting a message including an identifier associated with an application subscribed to receive selected events associated with a publisher operating on a data network. The apparatus also includes means for receiving an indication of an event notification associated with the publisher based on one or more subscriptions to the selected events. The apparatus also includes means for determining whether one or more applications are subscribed to receive the event notification. The apparatus further includes means for providing, in a case where the one or more applications are subscribed to receive the event notification, the indication of the event notification to the one or more applications.

The disclosed subject matter relates to a system for messaging between application, the system including a server component; and a client component having an interface to the server component. The server component being configured to receive, from the client component, a message including an identifier associated with a subscriber having a subscription to receive selected events associated with a publisher operating on a data network. The server component being also configured to receive, from the publisher, an event notification of at least one of the selected events. The server component being also configured to determine whether the subscriber is subscribed to receive the event notification. The server component being further configured to transmit, in a case where the subscriber is subscribed to receive the event notification, an indication of the event notification to the client component. The client component being configured to transmit, to the server component, a message including an identifier associated with an application subscribed to receive selected events associated with a publisher operating on a data network. The client component being also configured to receive, from the server component, an indication of an event notification associated with the publisher based on one or more subscriptions to the selected events. The client component being also configured to determine whether one or more applications are subscribed to receive the event notification. The client component being further configured to provide, in a case where the one or more applications are subscribed to receive the event notification, the indication of the event notification to the one or more applications.

It is understood that other configurations of the subject disclosure will become readily apparent to those skilled in the art from the following detailed description, wherein various configurations of the subject disclosure are shown and described by way of illustration. As will be realized, the subject disclosure is capable of other and different configurations and its several details are capable of modification in various other respects, all without departing from the scope of the subject disclosure. Accordingly, the drawings and detailed description are to be regarded as illustrative in nature and not as restrictive.

BRIEF DESCRIPTION OF THE DRAWINGS

Certain features of the subject disclosure are set forth in the appended claims. However, for purpose of explanation, several implementations of the subject disclosure are set forth in the following figures.

DETAILED DESCRIPTION

Figure 1:
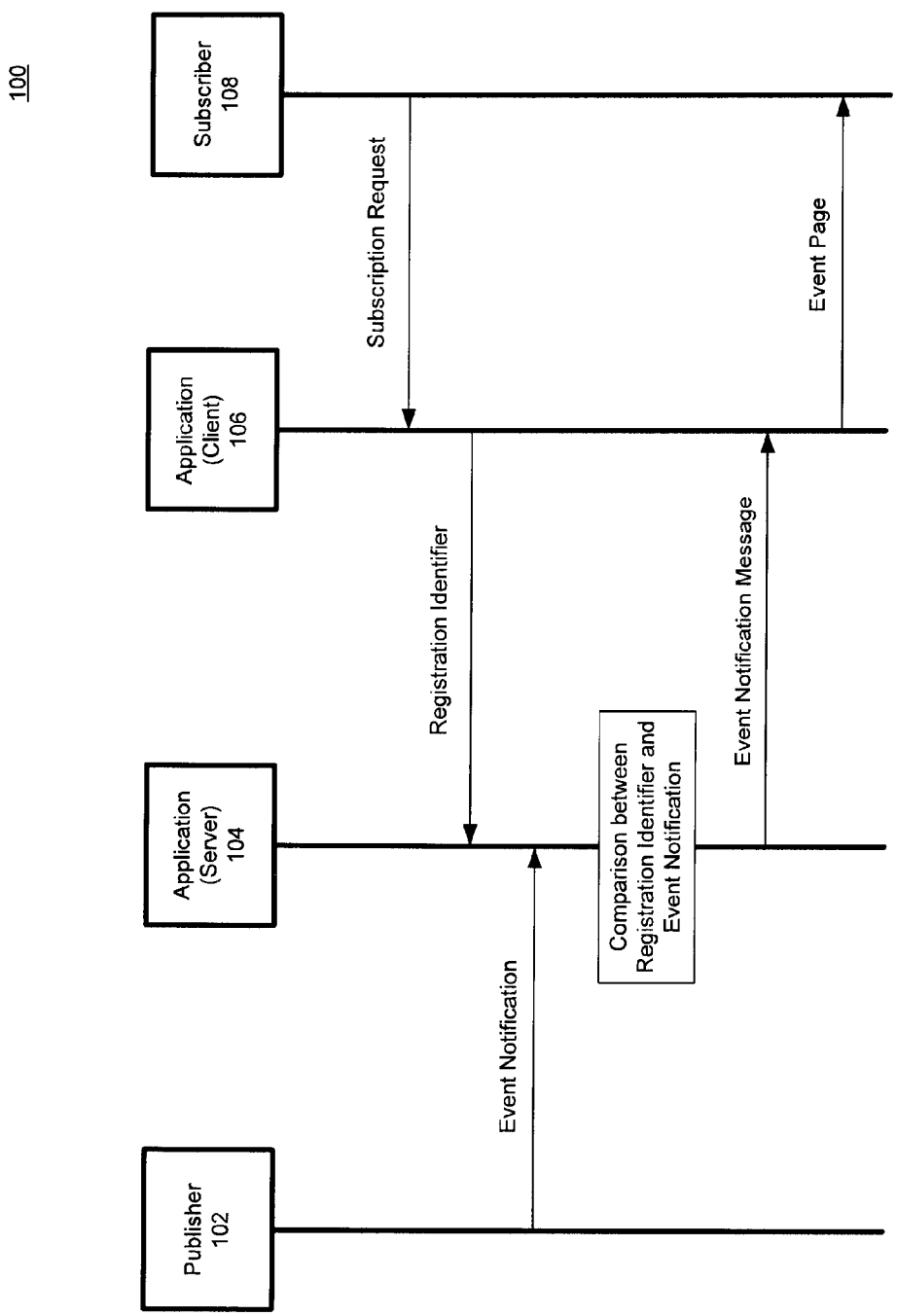
FIG. 1 illustrates an example flow diagram for messaging between applications according to one or more implementations.

The detailed description set forth below is intended as a description of various configurations of the subject disclosure and is not intended to represent the only configurations in which the subject disclosure may be practiced. The appended drawings are incorporated herein and constitute a part of the detailed description. The detailed description includes specific details for the purpose of providing a thorough understanding of the subject disclosure. However, it will be clear and apparent to those skilled in the art that the subject disclosure is not limited to the specific details set forth herein and may be practiced without these specific details. In some instances, well-known structures and components are shown in block diagram form in order to avoid obscuring the concepts of the subject disclosure.

A service website for a web application typically sends a notification (e.g., a web notification) to a user of the web application to notify the user about potential updates that are available for the web application. However, web notifications typically require a client (e.g., web application) to retrieve updated information on a network. That is, the web application typically employs polling mechanisms in order to retrieve the new data, such as a new e-mail message, from a server using Hypertext Transfer Protocol (HTTP) features (e.g., asynchronous Javascript and XML (AJAX) HTTP requests). Push notification mechanisms can typically require an application to have a user interface (UI) component. Given the increasing popularity of web-based applications sharing user-generated content over data networks, the conventional push notification mechanisms are not as scalable to meet the increasing demand of consuming applications. Hence, it may be desirable to enhance typical push notification systems between web-based applications in a more efficient manner.

The subject disclosure provides for a system that facilitates web messaging between web applications, in which a server component can push messages (or at least data) on the web (or Internet) to their client components. The client component performs a registration flow where the client component receives a registration identifier (or channel identifier) and sends the identifier to the server component to be stored alongside a user record associated with the client component. The client component calls an application-programming interface (API) to acquire the channel identifier for a user currently logged into the client component or a local application in communication with the client component. The client component can also locally store this channel identifier along-side a user record. The server component will listen for notifications on the web relating to events associated with a publishing entity. The server component can generate an event message to notify the client component of the detected events. The server component calls a public API to have the event message containing an event notification from the publishing entity be pushed (or sent) to the client component. In addition, notification of a new event can be displayed via an event page at a subscribing application when a new event message arrives at the client component.

More particularly, the subject disclosure provides for messaging between web applications. In an aspect, the server component receives, from the client component, a message including an identifier associated with a subscriber having a subscription to receive selected events associated with a publisher operating on a data network. Upon detecting an event associated with the publisher, the server component receives, from the publisher, an event notification of at least one of the selected events that the subscribed is subscribed to receive. The server component then forwards the event notification to the client component if it is determined that the subscriber is subscribed to receive the event notification. The server component is also configured to wake up one or more applications running at the client-side when the server component detects a new subscribed event. The server component sends a wake-up notification to the client component. The event notification from the server component can be broadcast to one or more client components if the contents contained therein are available for public viewing. Alternatively, the event notification can be a user-specific transmission such that only the authorized client component can receive the message from the server component. The event notification can be displayed via an event page at one or more applications associated with the user intended to receive the subscribed event(s).

Web Applications and Browser Extensions

A web browser executed by a client device can receive code (e.g., HTML code) from a remote server (e.g., server that hosts a website) and can execute the receive code on the client device for the benefit of a user of the client device. Throughout this document, the terms web browser and browser application may be used interchangeably to mean the same. In various implementations, the web browser includes or is associated with one or more web applications. A web application can be configured to a single task or multiple tasks for a user. In this regard, the web application may be configured to be executed or interpreted by the web browser. In contrast, native applications include machine executable code and are configured to executed directly by a processor or via an operating system of the client device, whereas the web application may be incapable of execution on a display without the aid of the web browser. Hence, web applications can run inside the web browser with a dedicated user interface, and typically provide enhanced functionality compared to standalone websites. Examples of a web application, include but are not limited to, games, photo editors, and video players.

A web application, browser application, or an installed application can refer to a number of types of applications that are installed in a browser application. Web applications can be "hosted applications" or "packaged applications." Hosted applications may include at least a portion of a web site that itself includes web pages, plus some metadata that may be especially pertinent to the web application or to the user of the web application to allow the web application to perform some particular functionality for the user. Packaged applications can be thought of as web applications whose code is bundled, so that the user can download all of the content of the web application for execution by the browser. A packaged web application may not need to have network access to perform its functionality for the user, and rather may be executed successfully by the browser locally on the computing device without access to a network. Packaged web applications have the option of using Extension APIs, allowing packaged applications to change the way the browser behaves or looks.

In various implementations, the web browser may include or be configured to interact with one or more browser extensions. In this context, a "browser extension" may include one or more web pages packaged or grouped together as a definable whole, and configured to extend the functionality to the web browser. Thus, extensions also provide extra functionality to a browser, but generally, unlike applications, there is little or no user interface component to the functionality provided by an extension. Instead, web extensions extend the functionality of the browser and the web sites being viewed therein.

In another example, the web application may be associated with a background element that is an invisible element in the browser application that includes instructions related to one or more visible elements of the web application in the browser application. Upon the triggering of an event (e.g., receipt of a new message), the background element executes the instructions on an associated page to perform functions related to the one or more visible elements of the installed web application.

In some implementations, background elements are used to include additional functionality related to a declared association with either the web application or extension application, or other types of applications installed in the browser application. For example, the background element may be used to provide notifications, download data from a server in the background, upload data to a server, or prepare a user interface.

Event Pages

An "event page" is an invisible web element or web page in a browser application, which is loaded in the browser application when needed and unloaded when idle. An event page does not continue to run and execute code at all times. Thus, an event page may save more resources than a background page. An event page may also include a declared association with an installed web application or browser extension that is associated the browser application or with a user account of the browser application.

Thus, unlike a background page that continues to run and execute code even when a web application, browser extension, and/or the browser application have no visible windows, and event page may not continue to run or execute code when a web application, browser extension or browser application have no visible windows. In this manner, the event page is not persistent when the web application, browser extension, and/or the browser application associated with the background page is closed. Therefore, event pages may save memory.

In some implementations, however, the event page may persist even when the browser has no tabs or windows open, such as when a background process associated with the browser application is still running. In such an implementation, if an event occurs during the time that the browser has no tabs or windows open but when a background process associated with the browser application is still running, the event page may still be loaded to handle the event.

Push Notifications

Push technology is a style of Internet communications where a request for a given transaction is initiated by a publisher or a central server. This is in contrast with pull technology, where a request for transmission of information is initiated by a receiver or client. A hypertext transfer protocol (HTTP) server push (also known as HTTP streaming) is a way to send data from a web server to a web browser. HTTP server push can be achieved by several techniques. In some cases, a web server does not terminate a connection after response data has been served to a client. The web server leaves the connection open so that if an event is received, it can immediately be sent to one or multiple clients. Otherwise, the data would have to be queued until the client's next request is received. Push notifications may use a constantly-open IP connection to provide notifications from servers (e.g., notifications related to third party web applications or browser extensions) to client computing devices (e.g., smart phones used by users who have installed the web applications or browser extensions). The notifications may include sounds, images, or custom text alerts, for example. Throughout this document, the terms push notifications, push technology and push notification delivery mechanism may be used interchangeably to mean the same.

An active notification may include a feature to immediately alert a user, such as a sound alert, a desktop alert, a pop-up window, or animation. Passive notifications, in contrast, may operate in a background of a web browser for example. A passive notification may include an indicator or information shown in a web browser, such as near a web application icon in the browser. As an example, a graphical icon representing a chess game application may include next to it a message that a good friend of a user is using the application right now, which may entice the user to launch the chess application and join in a game with his/her friend. As another example, a game developer may provide a notification in association with an icon representing the game, where the notification indicates that a new level of the game is available, or that an activity in a game is awaiting a user action, which may entice many users to launch the game. As yet another example, a group purchase application may provide a notification in association with an icon representing the application to indicate that a new offer is presented for a user. Passive notifications may entice a user to re-engage with an application.

Authentication and Authorization

Many web applications have counterpart mobile applications, such as native applications. The native applications typically require a user's credentials to authenticate them. Authentication procedures typically use web-based protocols (e.g., OAuth 1.0, OAuth 2.0, OpenID, OpenID Connect, SAML). To enable a mobile application to use the web-based protocols, the mobile device's user would typically use an embedded web browser on the mobile device. Authentication procedures typically provide for an application to perform a one-time registration with a provider, and as part of the registration specifies a redirect URL. The application then starts an authentication flow to a provider by redirecting a user's application (e.g., web browser) to a provider URL. In this regard, the embedded web view would typically point to a URL of a web page associated with the native application (e.g., login page).

The provider authenticates the user and requests the user to authorize the application to access the requested data. Upon user approval, the provider redirects back to the URL the application specified at registration. In this regard, after the user successfully logs into the web site, the web site typically redirects the user to a page that generates a token, which is then passed to the native application for authentication. The token can be communicated back to the native application as a cookie or window title. After the web site has generated the token and included the token in a response via the cookie or window title, the native application typically extracts the token and closes the embedded web view. Upon receipt of the token, the token can be used by the native application to authenticate calls to the application's server-side APIs.

During application registration, a client identifier, one or more redirect URLs, and a client secret may be specified. A request for authentication would typically include the client identifier and redirect URL, as well as an indication of the type of application (e.g., web server, JavaScript, device, installed application). Upon receipt of the request, an authentication server may select an active session associated with the requesting application if the user was already logged in, accept and validate the user credentials, obtain user consent for the requested permissions, and return a response to the application. The contents of the response may depend upon the type of application. For web applications, the response may be an authorization code, which can be exchanged for an access token and/or refresh token. For client-side applications (or installed applications), the response may be an access token. After obtaining the access token, the application can use the access token to make a web service request to an API endpoint that in return provides profile information about the user. In some examples, access tokens are sent to the API endpoint in the HTTP authorization header, or as a query string parameter if HTTP header operations are not available.

In an aspect, an authorization server supports web server applications (e.g., PHP, Java, Python, Ruby, ASP.NET) and mobile applications (e.g., mobile operating systems). A sequence with the authorization servers begins with redirecting an embedding application (e.g., embedded web browser) to a URL with a set of query parameters that indicate the type of endpoint API access a requesting application requires. The authorization server can be configured to handle the user authentication, session selection and user consent, but the result of the sequence is an authorization code. After receiving the authorization code, the application can exchange the code for an access token and a refresh token.

In another aspect, the authorization server supports JavaScript applications (e.g., JavaScript running in a web browser). In response to a request, the authorization server issues an access token given the type of the application (i.e., JavaScript). The client can validate the received token, and thereafter include the access token in an endpoint API request.

User Accounts

A user account allows a user to authenticate to system services (e.g., web applications) and receive authorization to access them. To log in to a user account, a user may authenticate herself with a password or other credentials for the purposes of accounting, security, and resource management, for example. Once the user has logged on (e.g., to a web browser, to a computing device, etc.) an operating system may use an identifier such as an integer to refer to the user, rather than a username. For example, the username may be correlated with a user identifier. A system may reconcile and validate the proper ownership of user accounts, and can permanently link ownership of those user accounts to particular individuals by assigning a unique identifier to validated account login identifiers (e.g., user names and passwords, secure identifiers, etc.). The system may validate those individuals only having account login identifiers for the appropriate systems and applications, for example according to an organization's business policies, access control policies, and various application requirements.

A unique identifier in the context of identity correlation may be any identifier that is guaranteed to be unique among all identifiers used for a group of individuals and for a specific purpose. Unique identifiers may be serial numbers assigned incrementally, random numbers selected from a number space much larger than the maximum (or expected) number of objects to be identified, names, or codes allocated by choice but verified as unique. Unique identifiers may be used to sync web applications, browser extensions, and responses among various computing devices accessible to a user.

FIG. 1 illustrates an example flow diagram for web messaging between applications. In some example aspects, messaging between applications is facilitated by a network environment 100 including a publisher 102, a server application 104, a client application 106 and a subscriber 108. The publisher 102 can be an application operating on an electronic device or a server providing and/or publishing content over a network. The server application 104 can be a server configured to communicate between the publisher 102 and the client application 106. The server application 104 is configured to push small messages to its client components (e.g., client application 106). The client application 106 can be a web application (i.e., a web-based application having a web browser), a JavaScript application, or an installed application. The subscriber 108 can be an application running on a client-side device that is in communication with or at least have an interface to the client application 106. The subscriber 108 can be one or more applications associated with a particular user.

The client application 106 receives a subscription request from the subscriber 108 requesting a subscription to receive selected events associated with the publisher 102. The request triggers the client application 106 to contact its counterpart (e.g., the server application 104) to listen for the subscribed events on the web. The client application 106 obtains a registration identifier that identifies the subscriber 108. The client application 106 then provides the registration identifier to the server application 104 to determine what applications are intended to receive the selected events. The application server 104 can listen for the selected events from the publisher 102 at an API endpoint (not shown). Upon detection, the server application 104 receives an event notification from the publisher 102. The event notification may include an event identifier, which enables the server application 104 to perform a comparison between the registration identifier and the event identifier to determine a match. Upon determine a match, the server application 104 transmits the event notification to the client application 106. The client application 106 can determine whether one or more applications are selected to receive the event notification. That is, the event notification can be forward to a single application or multiple applications based on their association with the intended user. The event notification can be provided to the subscriber (or subscribing application) via an event page, which provides an alert pop-up window with the event notification.

The client application 106 performs a registration flow that includes obtaining the registration identifier or a channel identifier associated with the subscriber 108 to be sent to the server application 104 for storage with a corresponding user record. The client application 106 calls a JavaScript-enabled API to obtain the registration identifier (or channel identifier) for the user of the subscriber 108 currently logged in to the client application 106. In some examples, the user may be required to grant permission for the client application 106 and/or server application 104 to push notifications to the subscriber 108. In an aspect, the user may be required to log in to the client application 106 when the subscriber 108 is first installed at the client-side. The channel identifier in effect may be available to the subscriber 108 without the need to request the user to log in subsequent times. In another aspect, the user may be required to log in to the client application 106 when the API is called to provide the registration identifier.

The messages communicated between the server application 104 and client application 106 may have a payload that reduces the amount of bandwidth necessary between the two interfaces. The message may contain two fields to identify the channel identifier and the payload. For example, the message payload can be a maximum size of 1 KB.

The server application 104 can be configured to call a server to server API (not shown) for sending messages. The API authenticates the calling application (i.e., the server application 104) and determines what application is registered (or subscribed) to receive the message. When a message is received from the server application 104, the API performs a validation in the push notification system to determine the intended recipient. In some aspects, the message payload will be delivered to every client application whether the appropriate user is logged in. If there are multiple messages that are queued for each application and a new client application comes online with the appropriate user, then the new client application may not receive all of the queued messages but may receive at least the most recent message for that client application.

The server application 104 may define one or more client types and one or more object sources, in which the client type will subscribe to the corresponding object source. In an aspect, the push mechanism associated with the server application 104 can be integrated into listener code that causes one or more computing devices on the network to listen for subscribed events associated with the publisher 102. The server application 104 may receive all notifications for all applications subscribed to receive the subscribed events. To do so, the client type is associated with one or more object identifiers per application.

The server application 104 receives an event notification from the publisher 102. The server application 104 is configured to listen for events associated with the publisher 102. In some implementations, the event is identified within the event notification as an event identifier. The event identifier may be used by the server application 104 during a comparison with the registration identifier associated with the subscriber 108 to determine the intended recipient of the event notification. Upon detecting one or more events, the server application 104 generates a message for the client application 106 to inform the client application 106 of the event notification. In some aspects, the server application 104 can be configured to publish the detected events for the client application to receive for display via one or more applications at the client-side. The event notification includes a callback function to allow the subscriber 108 to follow up at a particular time or scheduled time to retrieve content or content updates associated with the publisher 102. The server application 104 determines whether the client application 106 has one or more applications associated with the user identified to receive the event notification. Upon determining that the client application 106 has applications subscribed to receive notifications associated with the publisher 102, the server application 104 transmits a message containing the event notification for distribution by the client application 106 at the client-side.

In determining whether the client application 106 has one or more applications registered to receive content updates generated by publisher 102, the server application 104 compares an identifier associated with the client application 106 and at least a portion of the received event notification. The event notification includes an event identifier for identifying one or more selected events. The identifier is a registration identifier pertaining to a registration by the subscriber 108. In other example aspects, the identifier is a channel identifier pertaining to a channel carrying communications associated with the second application. As such, the server application 104 compares the registration identifier (or channel identifier) with the event identifier to determine a match. The registration identifier and event identifier are stored by the server application 104 in a data structure such that the server application 104 can look up each of the identifiers during the comparison.

In some implementations, the server application 104 parses the event notification to obtain an event descriptor associated with the publisher 102. In some examples, the event descriptor contains the event identifier. The server application 104 compares at least a portion of the event descriptor with an extension identifier associated with the client application 106. The extension identifier includes a pattern of information detectable by the server application 104. The client application 106 can obtain user preference settings via a user interface. The obtained settings can be sent to the server application 104 in a message to be later used by the server application 104 during the comparison. In an example, the server application 104 obtains the user preference settings from the client application 106 during receipt of the registration identifier. In some example aspects, the server application 104 stores the user preference settings in a memory (e.g., a local library or a data structure). As such, the server application 104 then compares the stored user preference settings with a least a portion of the event notification such that the event(s) with the matching event identifier can be sent to the subscribed application(s).

The system for message between web applications can facilitate conservation of power consumption by the subscribed applications at the client-side. In some implementations, the server application 104 detects whether one or more applications associated with the client application 106 is in a sleep state. For example, the applications may be offline or powered off during the sleep state. Upon receipt of the event notification, the server application 104 transmits a wakeup notification to the client application 106 such that the client application 106 requests the applications to transition from a sleep state to a wakeup state. That is, the application comes online or powered on after transitioning to the wakeup state.

The system for message between web applications can also facilitate push notification of user-specific messaging. The server application 104 authenticates the client application 106 to determine whether the client application 106 is authorized to access and/or receive the event notification. The client application 106 may also be configured to authenticate the one or more applications subscribed to receive the event notification. The authentication flow provides for access without sharing or accessing private credentials (e.g., username/password). The subscriber 108 interacting with the client application 106 can choose to select any type of delegated authorization. The server application 104 may receive a user input via a user interface at the client application 106 during the authentication to receive an indication of user consent, which authorizes the client application 106 to receive notifications relating to content of interest to the subscriber 108. In some implementations, the network environment 100 and the above-described elements may be varied and are not limited to the functions, structures, configurations, implementations or examples provided.

Figure 2:
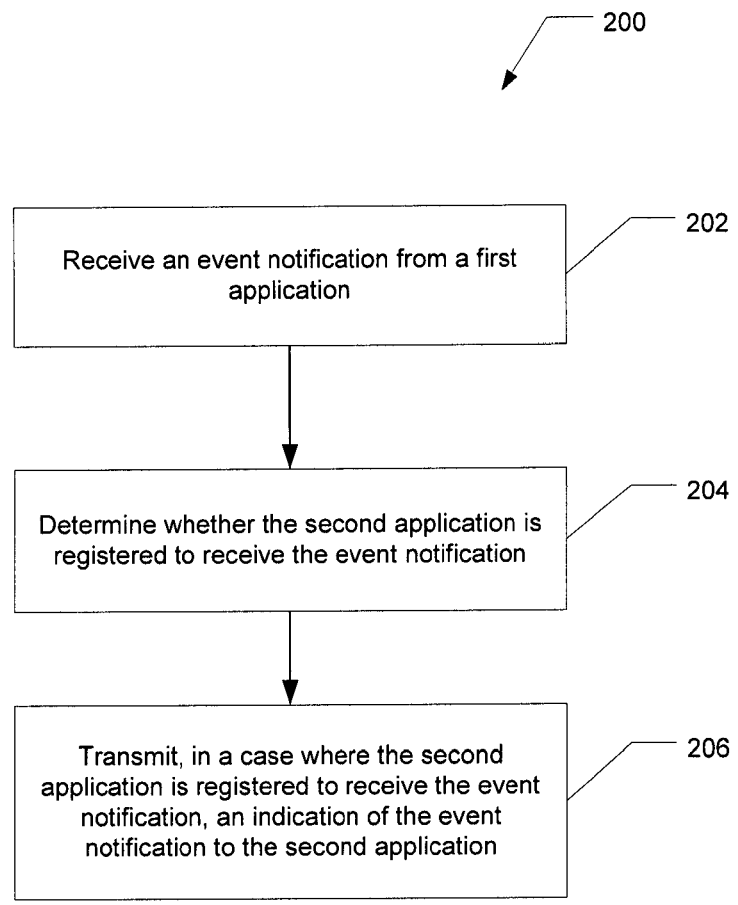
FIG. 2 illustrates a flowchart illustrating an example messaging between applications according to one or more implementations.

FIG. 2 illustrates a flowchart that relates to a computer-implemented method 200 for messaging between web applications. The steps of the flowchart do not need to be performed in the order shown. At step 202, the server application 104 (FIG. 1) receives an event notification from a publisher application 102 (FIG. 1). In some example aspects, the event notification includes an event identifier that, when compared to a registration identifier associated with a subscriber application (e.g., Subscriber 108), authorizes the subscriber application to receive a notification (or message) pertaining to content updates associated with the publisher application 102. The event notification can also include a callback function that enables the subscriber application to follow-up with the event notification. The callback function may be a pointer to a function that directs the subscriber application to a network address (or endpoint) for locating content updates provided (or posted) by the publisher application 102. The method 200 and the above-described elements may be varied and are not limited to the functions, structures, configurations, implementations or examples provided by FIG. 1.

At step 204, the server application 104 determines whether the client application 106 is registered to receive the event notification transmitted by the publisher application 102. The step of determining includes detecting whether the client application 106 is in a sleep state. Rather than waiting for the client application 106 to request for content updates by the application 102 from the server application 104, the server application 104 listens (or monitors) the web for event notifications from the publisher application 102. That is, the server application 104 pushes content updates to the client application 106 when the server application 104 detects the event notification from the publisher application 102.

In some implementations, the server application 104 wakes up the client application 106 if the server application 104 determines that the client application 106 is offline or powered off. The determining step also includes parsing the event notification to obtain an event descriptor associated with the publisher application 102. For example, the server application 104 obtains the event notification and parses at least a portion of the event notification. The parsed portion may be an event descriptor that is indicative of content associated with the application 102. In another example, the parsed portion is indicative of an event identifier that indexes the selected events produced by the publisher application 102.

Moreover, the determining step includes comparing the event descriptor with an extension identifier associated with the client application 106. In this regard, the extension identifier identifies the client application 106 including preferences corresponding to the client application 106 so the server application 104 can determine whether to forward the event notification to the client application 106. In some example aspects, the extension identifier is pre-defined by the client application 106. In other example aspects, the extension identifier is generated by the server application 104 for use by the client application 106. In this regard, at least a portion of the extension identifier is associated with the server application 104. For example, the portion of the extension identifier may identify the server application 104.

In one or more implementations, the determining step includes obtaining user preference settings via a user interface. The user interface may be provided at the client application 106 or at one or more applications in communication with the client application 106. The user preference settings can be transmitted concurrently with the registration identifier (or channel identifier) to the server application 104. Alternatively, the user preference settings are transmitted at or during a defined time period.

In one or more implementations, the determining step includes storing the user preference settings in a memory. The server application 104 may access a local library (or a data structure) for storage purposes. As such, the stored user preference settings can be compared with at least a portion of the event notification. Accordingly, the comparison results enables the server application 104 to determine whether the client application 106 is registered to receive web notifications associated with the application 102. In another aspect, the comparison may be performed by the client application 106 using the event notification and registered identifier.

At step 206, the server application 104 transmits, in a case where the second application is registered to receive the event notification, a message indicative of the event notification to the subscriber application (or client application 106). In some example aspects, the server application 104 transmits, upon receipt of the event notification, a wakeup notification to the client application 106 such that the client application 106 requests one or more subscriber applications to transition from a sleep state (e.g., offline, powered off) to a wakeup state (e.g., online, powered on).

The messages transmitted between the server application 104 and the client application 106 may include, but is not limited to, two fields. The first field identifies a channel identifier that the client application 106 obtains during a registration of one or more subscriber applications, which is then stored with a user record (e.g., user profile) at the server application 104. The second field identifies a payload that carries a defined number of data bits (e.g., a valid Javascript Object Notation (JSON) with 1 KB capacity) representing the message to the client application 106. In some implementations, the computer-implemented method 200 and the above-described elements may be varied and are not limited to the functions, structures, configurations, implementations or examples provided.

Figure 3:
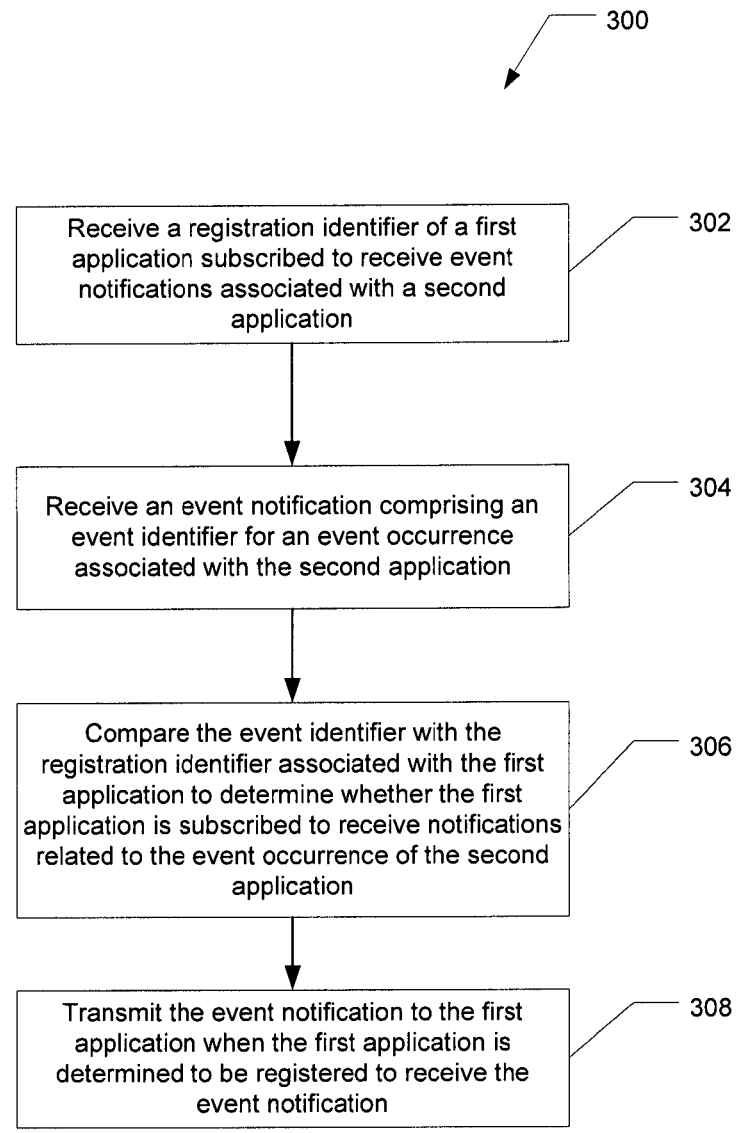
FIG. 3 illustrates a flowchart illustrating another example messaging between applications according to one or more implementations.

FIG. 3 illustrates a flowchart that relates to a computer-implemented method 300 for messaging between applications. At step 302, a registration identifier of a subscriber application (e.g., subscriber 108, FIG. 1) is received at a server application 104 (FIG. 1) so that the subscriber application can be notified of event occurrences (or content updates) associated with a publisher application (e.g., publisher 102, FIG. 1) operating on a data network. The registration identifier can be associated with the type of notifications the subscriber 108 is subscribed to receive. The server application 104 can store the received identifier with a corresponding user profile in a local library (or data structure) of the server application 104. The method 300 and the above-described elements may be varied and are not limited to the functions, structures, configurations, implementations or examples provided by FIG. 1.

At step 304, the server application 104 listens for event occurrences of the publisher 102 on the web. The server application 104 receives an event notification identifying content updates associated with the application 102. Upon receiving the event notification, the server application 104 calls a public API to request the API to push the event notification to the client application 106. In some implementations, the server application 104 calls a server-to-server API to send a message (or indication) over a proprietary network to counterpart components of the server application 104 (e.g., client application 106). The client application 106 can be presented with a new event via an event page on a display of the client application 106 (or one or more subscriber applications) that represents the pushed message from the server application 104.

At step 306, a determination is made of whether the client application 106 is registered to receive the event notification. The server application 104 compares the registration identifier associated with the client application 106 (or subscriber application) and the event identifier contained within the event notification to determine a match. In one or more implementations, the server application 104 may compare content associated with the event occurrence of the publisher 102 and user content preferences associated with a user operating on the client application 106 (or subscriber application). The match indicates that the client application 106 (or subscriber application) is subscribed to receive notifications associated with the publisher 102.

At step 308, the event notification generated by the publisher 102 is forwarded by the server application 104 to the client application 106 when the server application 104 determines that the client application 106 is registered to receive such notifications. In another aspect, the server application 104 forwards the event notification to the client application 106 such that the client application 106 determines whether one or more subscriber applications are the intended recipients. As such, the client application 106 can perform the comparison similarly to the server application 104. The server application 104 generates a message that is indicative of the event occurrence at the publisher 102 upon receipt of the event notification. The event notification may be contained within the payload portion of the message. In some implementations, the computer-implemented method 300 and the above-described elements may be varied and are not limited to the functions, structures, configurations, implementations or examples provided.

Figure 4:
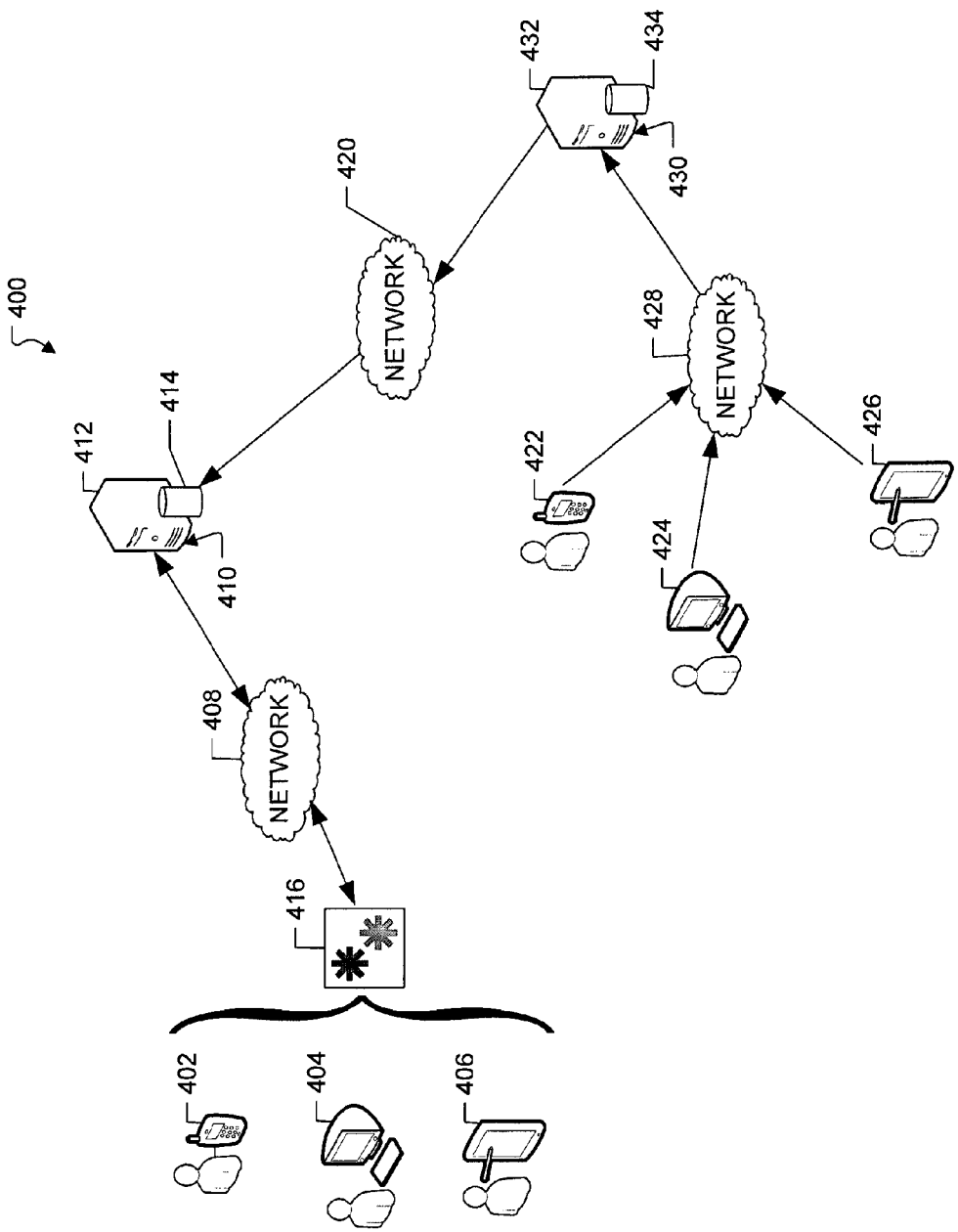
FIG. 4 illustrates an example client-server network environment which provides for messaging between applications according to one or more implementations.

FIG. 4 illustrates an example client-server network environment which provides for web messaging between applications. That is, the subject disclosure provides a scalable push notification delivery mechanism for applications operating on electronic devices. In some aspects, the push notification delivery mechanism pushes a notification to an application when content associated with the application is stale (or out of date). Accordingly, the push notification delivery mechanism enables the application to retrieve content updates. In one or more examples, an event is indicative of one or more content updates. As such, event notifications can be immediately pushed to the subscribed application.

A network environment 400 includes a number of electronic devices 402-406 communicably connected to a server 410 by a network 408. Server 410 includes a processing device 412 and a repository 414. Processing device 412 executes computer instructions stored in repository 414, for example, to facilitate notifications of events generated by applications operating on electronic devices 402-406. The server 410 has a counterpart component, client application 416. The client application 416 is configured to register one or more applications for subscriptions to receive subscribed content, and distribute the subscribed content to authorized applications. In addition, the network environment 400 includes a number of electronic devices 422-426 communicably connected to a server 430 by a network 428. Server 430 includes a processing device 432 and repository 434. Notifications from server 430 can be detected immediately across network 420 by server 410, for example.

Users interacting with electronic devices 422-426 employ a scalable push notification delivery mechanism for web applications, extension applications, and installed applications. For example, the disclosed subject matter involves enabling a web application operating on one of electronic devices 422-426 to publish information on network 420 that could then be immediately pushed to a number of other web applications having subscriptions on network 408 to receive the published information (e.g., subscriber applications operating on electronic devices 402-406).

A server component and a client component of the push notification delivery mechanism can be integrated with a platform application (e.g., a web browser) operating on electronic devices 402-406. That is, an abstraction layer may be built on top of the push notification delivery mechanism that enables users interacting with subscriber applications operating on electronic devices 402-406 to receive pushed messages from corresponding servers (e.g., server 410) via counterpart client components operating on electronic devices 402-406 (e.g., client component 416). Hence, the client components are informed when their state is out of date with their server counterpart.

In one or more implementations, the client application 416 operating on at least one of electronic devices 402-406 employs a registration process to obtain a registration identifier (or channel identifier), and then send the identifier associated with one or more subscriber applications to server 410 for storage with a corresponding user record (e.g., user account) in a memory (e.g., repository 414) of server 410. The registration process allows the web application operating on the electronic device to subscribe for certain web notifications pertaining to content updates by applications running on electronic devices 422-426. In one example, the web application subscribes to receive specific real-time events (or dynamic events). In another example, the web application subscribes to receive predefined events (or static events). In some implementations, server 410 determines an event update after listening for event occurrences related to the applications 422-426. That is, a source owner (e.g., web application running on electronic device 422) provides the server 430 of an event occurrence to be published on the network 420.

The client application 416 registers the subscriber applications 402-406 to enable the server 410 to listen for selected events on the web according to one or more subscriptions. The registration process involves assigning a channel identifier (or registration identifier) to at least one of the subscriber applications 402-406. For example, server 410 calls an API in a case where the user interacting with one of electronic devices 422-426 is currently logged on to a web browser account via the client application 106. In one or more examples, the API is Javascript embedded within a web page. The channel identifier (or registration identifier) may be available to the client application 416 without user interaction. That is, the channel identifier may be kept available to the client application 416 during subsequent attempts to obtain event notifications.

The server 410 can store the channel identifier with a user record associated with the client application in the repository 414. In an example, the channel identifier is stored in a local library (or data structure) defined as HTML local storage. In another example, the local library can have identifiers that indexes the user record within repository 414. The user record may be a user profile having parameters that define content of interest to the user. The user record may also include parameters concerning demographics and/or usage statistics of the user. In an aspect, the user has the option to select whether to have the user record obtain user-related data.

In an aspect, a user interacting with the client application 416 running on electronic device 402 authorizes at least one of the subscriber applications permission to receive published content via notifications through server 410. The user can grant permission during a login session within a web browser. In one or more examples, the grant is stored alongside the user record to facilitate a single sign-on (SSO) experience. The user can also grant permission during an installation session of the client application and thereby automatically allowing push notifications to be sent to the installed application (e.g., installed web applications, any web application using a defined Javascript call). In other instances, the user may be prompted to login and grant the permission when the API is called by server 410 to send a message to the client application 416.

In one or more implementations, server 410 communicates with a public API on network 408 in order to have a message pushed to the client application 416 for a corresponding web application executed to operate on electronic devices 402-406. The disclosed subject matter also provides for service providers to communicate with other APIs to send a message to be pushed to corresponding client components (e.g., a web browser component running on electronic devices 402-406). In other implementations, the server 410 may call a server-to-server API to send a message to the client application 416. The API authenticates the calling application (e.g., server 410) and determines the identity of the subscribed application targeted to receive the pushed message from the server 410.

Push notifications can reach a client application operating on electronic devices 402-406 while in a sleep state or an unloaded state. A new event associated with an application running on electronic devices 422-426 may be detected and displayed via an event page as a new notification arrival on at least one of the subscriber applications operating on any of electronic devices 422-426. Upon detecting the new event, the notification is displayed as an icon on a new tab page of a browser (or the subscriber application). The detected event may be processed using a predefined function: "application_name.onNewMessage." Event pages can receive a callback to a JavaScript function to follow up on the event notification. As such, the client application 416 is configured to retrieve the data or content associated with the event notification. That is, the client application 416 may use the callback function to retrieve data associated with the event via the server 410. In another aspect, the subscriber applications 402-406 may execute the callback function to receive further detailed information about the event notification.

The push notification delivery mechanism support subscriptions for delivery of event notifications to subscribed users (e.g., subscriber applications running on electronic devices 402-406). In an example, a new client type may be defined along with a new object source to subscribe to receive push notifications. A server application (e.g., server 410) is integrated with the push notification delivery mechanism (e.g., integrated into listener code) such that the server 410 receives all notifications for all subscribed applications. In another example, there may be one object identifier per subscribed application defined as "<add_id>.default." In this regard, the client application subscribes for the object source and the object identifiers of the format "<app_id>.default" for all applications that are installed.

In one or more examples, web notifications relating to an RSS feed may be pushed to one of electronic devices 402-406 with an indication that the RSS feed has been updated. The electronic device may be subscribed to receive the RSS feeds, and the server 410 checks (or listens) for updates by looking up an extension (or identifier) associated with the web application operating on the electronic device to determine whether the web application is subscribed to receive notifications relating to RSS feed updates. In this regard, the web application would call back a function specific to RSS feeds for retrieving the updated content from the server 410.

In some example implementations, electronic devices 402-406, 422-426 can be computing devices such as laptop or desktop computers, smartphones, personal digital assistants (PDAs), portable media players, tablet computers, or other appropriate computing devices that can be used to for secure delegated authentication for applications. In the example of FIG. 4, electronic devices 402, 422 are each depicted as a smartphone, electronic devices 404, 424 are each depicted as a desktop computer, and electronic devices 406, 426 are each depicted as a PDA.

In some example aspects, server 410 and server 430 can each be a single computing device such as a computer server. In other implementations, server 410 and server 430 can represent more than one computing device working together to perform the actions of a server computer (e.g., cloud computing). Examples of computing devices that may be used to implement servers 410, 430 include, but are not limited to, a web server, an application server, a proxy server, a network server, or a group of computing devices in a server farm. Furthermore, networks 408, 420 can each be a public communication network (e.g., the Internet, cellular data network, dialup modems over a telephone network) or a private communications network (e.g., private LAN, leased lines). In some implementations, the network environment 400 and the above-described elements may be varied and are not limited to the functions, structures, configurations, implementations or examples provided.

Figure 5:
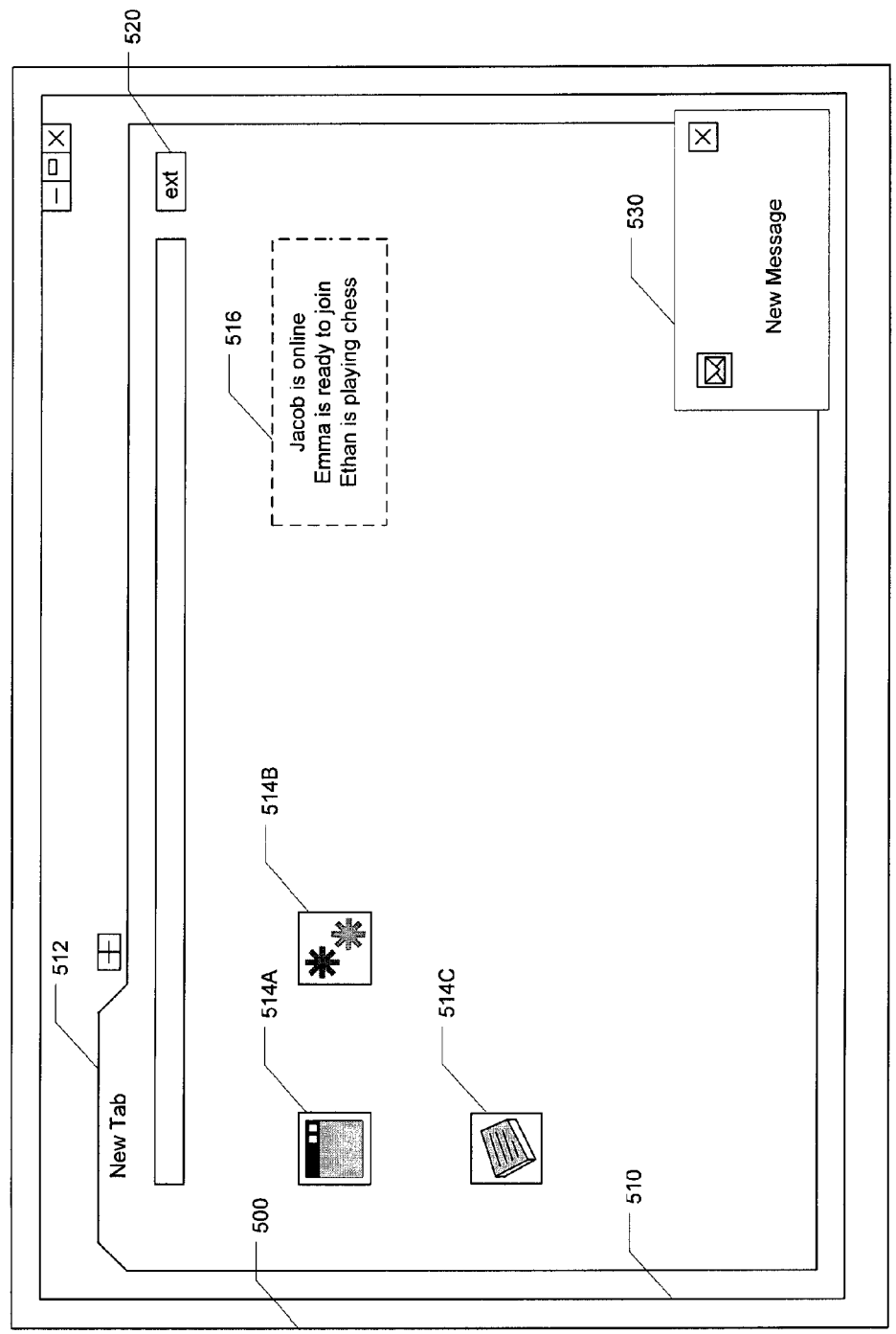
FIG. 5 illustrates a display including a user interface for a web browser according to one or more implementations.
Figure 6:
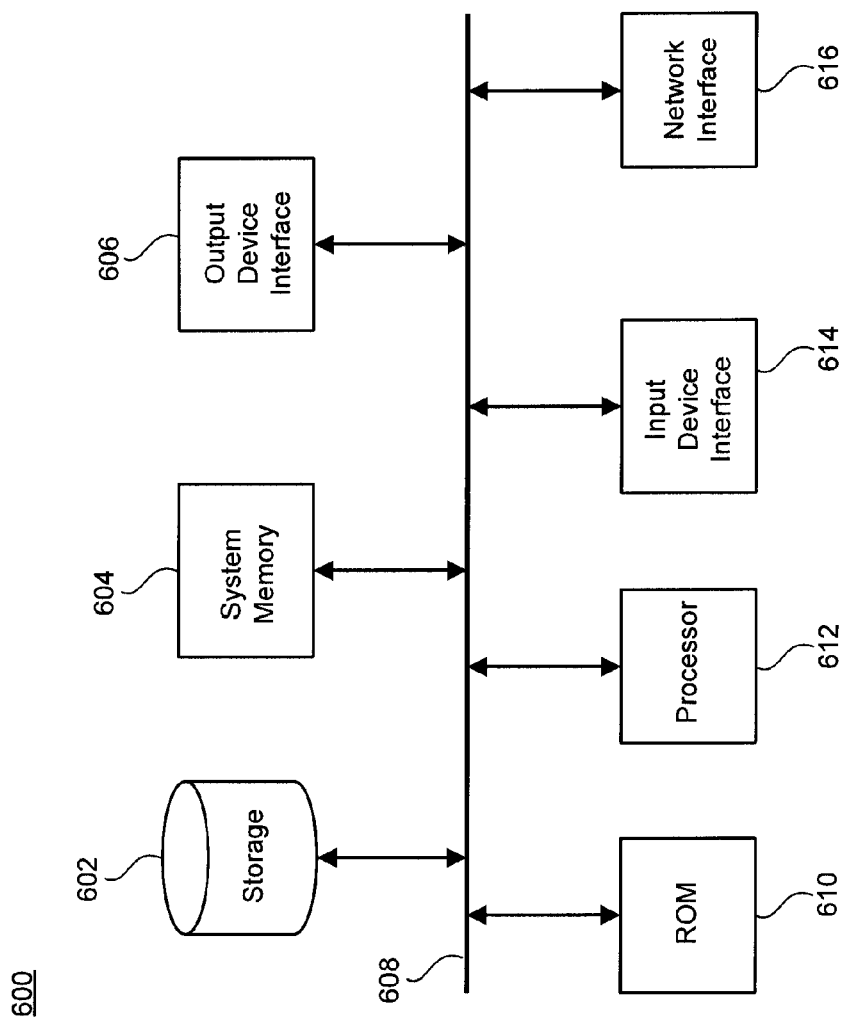
FIG. 6 conceptually illustrates an electronic system with which some implementations of the subject disclosure may be implemented.

FIG. 5 illustrates a display including a user interface for a web browser. Display 500 may be output device interface 606 as shown in FIG. 6, for example. Display 500 includes user interface 510, which may be displayed by a browser application that is executed by a computing device that may be connected to a network (e.g., the Internet). The browser application may open one or more tabs 512. User interface 510 includes indicators 514A, 514B and 514C representing web applications (e.g., software applications that may be executed in a browser-controlled environment). User interface 510 may also include one or more indicators 520 representing browser extensions (e.g., software extensions for web browsers).

User interface 510 may also include passive notification 516, which may be displayed simultaneously with indicators 514, for example. In the example depicted in FIG. 5, passive notification 516 includes information about players of a web application game represented by indicator 514A. Passive notification 516 may include text related to the web application game represented by indicator 514A, e.g.: "Jacob is online; Emma is ready to join; Ethan is playing chess" as shown in FIG. 5. The depiction, text, and location of passive notification 516 as shown in FIG. 5 is merely for illustration and may include graphics or other information. In one example, passive notification 516 appears in the background of tab 512 and/or may appear adjacent to indicators 515.

In some implementations, notifications may be active. For example, active notifications may include a pop-up window and/or sound alert. Active notification 530 is a pop-up window that includes an alert about the web application represented by indicator 515B, which states "New Message." Display 500 may temporarily display active notification 530 to alert a user about a notification for the web application 514B. In some implementations, active notifications 530 may flash, change colors, or be accompanied by a sound, animation, or other feature to notify a user of an update related to a web application associated with a user account.

In some implementations, a user may specify how notifications related to the installed web applications are presented. The specifications about how notifications are presented, which may be stored locally (e.g., electronic devices 402-406, 422-426 (FIG. 4)), may also be synced to other electronic devices accessible to the user, using application server 432 (FIG. 4). For example, users may specify if they wish to receive passive notifications in the background, and for which applications they wish to receive passive notifications. Users may also specify if they wish to receive active notifications, how they wish to receive active notifications (e.g., using sounds, pop-up windows, desktop notifications, animation, flash, text, etc.) and for which applications they wish to receive active notifications or passive notifications.

The information that is provided to or by notifications 516 and 530 (e.g., regarding who is using a web application, who is online, which users are subscribed to receive new messages, etc.) may be provided on an opt-in basis. In other words, such information may be provided from or to a server or an electronic device only if users of the web application(s) or browser extension(s) specifically authorize the transmission of such information. In addition, data may be kept anonymous in one or more ways before it is sent, so that personally identifiable information is removed (e.g., using registration identifiers or channel identifiers).

Notifications may be issued for any number of local reasons particular to the user of an electronic device, which may be irrelevant to a general user. For example, a web application game may notify a user when the user's friends are playing the game online. Such notifications may be specific to a user and may not affect general users. Conversely, the user may ignore the notification if it is not relevant to the user. For example, if the notification indicates that a new level is available for a game or that a new coupon is available for a group purchasing deal application, a user may ignore the notification. A notification may also be tailored based on user data (e.g., location, social map data, demographic data, usage patterns, etc.), but not particular to a certain user. For example, notifications may alert groups of a particular purchasing deal in a local area. A location of an electronic device (e.g., electronic devices 402-406, 422-426 (FIG. 4)) may be determined based on a location associated with an Internet Service Provider (ISP) or based on a geographic positioning sensor. For example, a known location of an ISP may be used as an approximation or as a proxy for the location of a client device. In some implementations, notifications may hook up to a native notification system (such as a system tray, taskbar, etc.). In those implementations, a user may receive notifications about web application without activating a browser application. In some implementations, the display 500 and the above-described elements may be varied and are not limited to the functions, structures, configurations, implementations or examples provided.

FIG. 6 conceptually illustrates an electronic system with which some implementations of the subject disclosure may be implemented. Electronic system 600 can be a server, computer, phone, PDA, a tablet computer, a television with one or more processors embedded therein or coupled thereto, or generally any electronic device. Such an electronic system includes various types of computer readable media and interfaces for various other types of computer readable media. Electronic system 600 includes a bus 608, processing unit(s) 612, a system memory 604, a read-only memory (ROM) 610, a permanent storage device 602, an input device interface 614, an output device interface 606, and a network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is powered off. Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such a random access memory. System memory 604 stores some of the instructions and data that the processor needs at runtime. In some implementations, the processes of the subject disclosure are stored in system memory 604, permanent storage device 602, and/or ROM 610. For example, the various memory units may include instructions for processing, generating, and/or providing verification requests and/or verification responses in accordance with some implementations. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interfaces 606 enables, for example, the display of images generated by the electronic system 600. Output devices used with output device interface 606 include, for example, printers and display devices, such as liquid crystal displays (LCD). Some implementations include devices such as a touchscreen that functions as both input and output devices.

Finally, as shown in FIG. 6, bus 608 also couples electronic system 600 to a network (not shown) through a network interface 616. In this manner, the computer can be a part of a network of computers (such as a local area network ("LAN"), a wide area network ("WAN"), or an Intranet, or a network of networks, such as the Internet. Any or all components of electronic system 600 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, such as an LCD monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in the subject disclosure can be implemented in a computing system that includes a back end component, such as a data server, or that includes a middleware component, such as an application server, or that includes a front end component, such as a client computer having a graphical user interface or a Web browser through which a user can interact with an implementation of the subject matter described in this specification, or any combination of one or more such back end, middleware, or front end components. The components of the system can be interconnected by any form or medium of digital data communication, such as a communication network. Examples of communication networks include a LAN and a WAN, an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject disclosure or that such aspect applies to all configurations of the subject disclosure. A disclosure relating to an aspect may apply to all configurations, or one or more configurations. A phrase such as an aspect may refer to one or more aspects and vice versa. A phrase such as a "configuration" does not imply that such configuration is essential to the subject disclosure or that such configuration applies to all configurations of the subject disclosure. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for messaging between applications via a web server, the method comprising:

receiving, from a client application, a message including an identifier for identifying a web application associated with the client application, the web application having a subscription to receive selected events associated with a publisher operating on a data network, the identifier being associated with a corresponding user;
  receiving, from the publisher, an event notification of at least one of the selected events;
  determining whether the web application is subscribed to receive the event notification; and
  providing, in a case where the web application is subscribed to receive the event notification, an indication of the event notification for transmission to the client application, the event notification forwarded to the web application via an event page, the event page being an invisible element of the client application, the indication of the event notification including a callback function executable through the event page by the web application,
wherein one or more other applications associated with the corresponding user are authorized to receive the event notification based on a match between the identifier associated with the corresponding user and at least a portion of the event notification.

2. The method of claim 1, wherein the identifier is a registration identifier pertaining to a registration by the web application or a channel identifier pertaining to a channel carrying communications associated with the web application.

3. The method of claim 2, wherein the event notification comprises an event identifier associated with one of the selected events.

4. The method of claim 3, further comprising:
storing the registration identifier with a user profile associated with the web application in a data structure; and
comparing the stored registration identifier with the event identifier to determine a match.

5. The method of claim 1, wherein the determining comprises detecting whether the web application is in a sleep state or an unloaded state.

6. The method of claim 5, wherein providing the indication for transmission comprises transmitting, upon receipt of the event notification, a wakeup notification to the web application for the web application to transition from the sleep state to a wakeup state.

7. The method of claim 5, wherein providing the indication for transmission comprises transmitting, upon receipt of the event notification, a wakeup notification to the web application for the web application to transition from the unloaded state to a loaded state.

8. The method of claim 1, further comprising receiving user consent via a user interface to authorize the web application to receive notifications relating to user-defined content.

9. The method of claim 1, further comprising authenticating the web application to authorize the web application with access to receive the event notification.

10. The method of claim 1, further comprising detecting an event associated with the publisher via the data network, the event being identified within the event notification.

11. The method of claim 1, wherein the determining comprises:
parsing the event notification to obtain an event descriptor associated with the web application; and
comparing at least a portion of the event descriptor with an extension identifier associated with the web application.

12. The method of claim 1, wherein the determining comprises:
obtaining user preference settings via a user interface; and
comparing the user preference settings with a least a portion of the event notification.

13. The method of claim 1, further comprising:
generating the indication in response to obtaining the event notification.

14. The method of claim 1, where the event notification is transmitted via a broadcast, a multicast or a unicast transmission.

15. The method of claim 1, further comprising:
calling an application programming interface (API) to push the event notification to the web application.

16. The method of claim 1, further comprising:
listening, via an HTTP endpoint, for the selected events associated with the publisher; and
detecting at least one of the selected events associated with the publisher at the HTTP endpoint.

17. A system for messaging between applications, the system comprising:
one or more processors; and
a memory including instructions that, when executed by the one or more processors, cause the one or more processors to facilitate the steps of:
receiving, from a client application, a message including an identifier for identifying a subscriber application associated with the client application, the subscriber application having a subscription to receive selected events associated with a publisher operating on a data network, the identifier being associated with a corresponding user;
receiving, from the publisher, an event notification of at least one of the selected events;
determining whether the subscriber application is subscribed to receive the event notification; and
providing, in a case where the subscriber application is subscribed to receive the event notification, an indication of the event notification for transmission to the client application, the event notification forwarded to the subscriber application via an event page, the event page being an invisible element of the client application, the indication of the event notification including a callback function executable through the event page by the subscriber application,
wherein one or more other applications associated with the corresponding user are authorized to receive the event notification based on a match between the identifier associated with the corresponding user and at least a portion of the event notification.

18. A non-transitory machine readable medium embodying instructions that, when executed by a machine, allow the machine to perform a method for messaging between applications, the method comprising:
receiving, from a client application, a message including an identifier for identifying a subscriber application associated with the client application, the subscriber application having a subscription to receive selected events associated with a publisher operating on a data network, the identifier being associated with a corresponding user;
receiving, from the publisher, an event notification of at least one of the selected events;
determining whether the subscriber application is subscribed to receive the event notification; and
providing, in a case where the subscriber application is subscribed to receive the event notification, an indication of the event notification for transmission to the client application, the event notification forwarded to the subscriber application via an event page, the event page being an invisible element of the client application, the indication of the event notification including a callback function executable through the event page by the subscriber application,
wherein one or more other applications associated with the corresponding user are authorized to receive the event notification based on a match between the identifier associated with the corresponding user and at least a portion of the event notification.

19. An apparatus for messaging between applications, the apparatus comprising:
- means for receiving, from a client application, a message including an identifier for identifying a subscriber application associated with the client application, the subscriber application having a subscription to receive selected events associated with a publisher operating on a data network, the identifier being associated with a corresponding user;
- means for receiving, from the publisher, an event notification of at least one of the selected events;
- means for determining whether the subscriber application is subscribed to receive the event notification; and
- means for providing, in a case where the subscriber application is subscribed to receive the event notification, an indication of the event notification for transmission to the client application, the event notification forwarded to the subscriber application via an event page, the event page being an invisible element of the client application, the indication of the event notification including a callback function executable through the event page by the subscriber application,
- wherein one or more other applications associated with the corresponding user are authorized to receive the event notification based on a match between the identifier associated with the corresponding user and at least a portion of the event notification.

20. A computer-implemented method for messaging between applications, the method comprising:
- transmitting, to a web server, a message including an identifier for identifying a web application subscribed to receive selected events associated with a publisher operating on a data network, the identifier being associated with a corresponding user;
- receiving, from the web server, an indication of an event notification associated with the publisher based on one or more subscriptions to the selected events;
- determining that the web application is subscribed to receive the event notification; and
- providing, in a case where the web application is subscribed to receive the event notification, an indication of the event notification from a client application to the web application via an event page, the event page being an invisible element of the client application, the indication of the event notification including a callback function executable through the event page by the web application,
- wherein one or more other applications associated with the corresponding user are authorized to receive the event notification based on a match between the identifier associated with the corresponding user and at least a portion of the event notification.

21. The method of claim 20, further comprising:
- receiving a request to register the web application to receive the selected events associated with the publisher;
- calling an application programming interface (API) to obtain a channel identifier for the web application; and
- storing the obtained channel identifier in a user profile associated with the web application.

22. The method of claim 21, further comprising:
- executing a function related to displaying a pop-up window for receiving a user input; and
- requesting user credentials associated with the web application via the pop-up window when the API is called.

23. The method of claim 20, further comprising:
- determining whether the web application has authorization to receive the event notification.

24. The method of claim 20, further comprising:
- upon an occurrence of an event associated with the publisher, loading the event page associated with the web application if the event is one of a set of events registered by the web application; and
- using the event page, executing a function related to displaying a pop-up alert with the event notification.

25. The method of claim 20, wherein the callback function provides a pointer to a function that directs the web application to retrieve data or content associated with the event notification.

26. The method of claim 20, wherein receiving the indication comprises receiving a wakeup notification to request the web application to transition from a sleep state to a wakeup state.

27. The method of claim 20, wherein receiving the indication comprises receiving a wakeup notification to request the web application to transition from an unloaded state to a loaded state.

28. A system for messaging between applications, the system comprising:
- one or more processors; and
- a memory including instructions that, when executed by the one or more processors, cause the one or more processors to facilitate the steps of:
  - transmitting a message including an identifier for identifying a web application subscribed to receive selected events associated with a publisher operating on a data network, the identifier being associated with a corresponding user;
  - receiving an indication of an event notification associated with the publisher based on one or more subscriptions to the selected events;
  - determining that the web application is subscribed to receive the event notification; and
  - providing, in a case where the web application is subscribed to receive the event notification, the indication of the event notification from a client application to the web application via an event page, the event page being an invisible element of the client application, the indication of the event notification including a callback function executable through the event page by the web application,
  - wherein one or more other applications associated with the corresponding user are authorized to receive the event notification based on a match between the identifier associated with the corresponding user and at least a portion of the event notification.

29. A non-transitory machine readable medium embodying instructions that, when executed by a machine, allow the machine to perform a method for messaging between applications, the method comprising:
- transmitting a message including an identifier for identifying an application subscribed to receive selected events associated with a publisher operating on a data network, the identifier being associated with a corresponding user;
- receiving an indication of an event notification associated with the publisher based on one or more subscriptions to the selected events;
- determining that the application is subscribed to receive the event notification; and
- providing, in a case where the application is subscribed to receive the event notification, the indication of the event notification to the application via an event page, the event page being an invisible element of a client application associated with the application, the indication of the event notification including a callback function executable through the event page by the application, wherein one or more other applications associated with the corresponding user are authorized to receive the event notification based on a match between the identifier associated with the corresponding user and at least a portion of the event notification.

30. An apparatus for messaging between applications, the apparatus comprising:
  means for transmitting a message including an identifier for identifying an application subscribed to receive selected events associated with a publisher operating on a data network, the identifier being associated with a corresponding user;
  means for receiving an indication of an event notification associated with the publisher based on one or more subscriptions to the selected events;
  means for determining that the application is subscribed to receive the event notification; and
  means for providing, in a case where the application is subscribed to receive the event notification, the indication of the event notification to the application via an event page, the event page being an invisible element of a client application associated with the application, the indication of the event notification including a callback function executable through the event page by the application,
  wherein one or more other applications associated with the corresponding user are authorized to receive the event notification based on a match between the identifier associated with the corresponding user and at least a portion of the event notification.

31. A system for messaging between application, the system comprising:
  a server component; and
  a client component having an interface to the server component,
  the server component comprising one or more first processors and a first memory including instructions that, when executed by the one or more first processors, cause the one or more first processors to:
    receive, from the client component, a message including an identifier for identifying a web application associated with the client component, the web application having a subscription to receive selected events associated with a publisher operating on a data network, the identifier being associated with a corresponding user,
    receive, from the publisher, an event notification of at least one of the selected events,
    determine whether the web application is subscribed to receive the event notification, and
    provide, in a case where the web application is subscribed to receive the event notification, an indication of the event notification for transmission to the client component, the event notification being forwarded to the web application via an event page, the event page being an invisible element of the client application, the indication of the event notification including a callback function executable through the event page by the web application; and
  the client component comprising one or more second processors and a second memory including instructions that, when executed by the one or more second processors, cause the one or more second processors to:
    transmit, to the server component, the message including the identifier for identifying the web application subscribed to receive the selected events associated with the publisher operating on the data network,
    receive, from the server component, the indication of the event notification associated with the publisher based on one or more subscriptions to the selected events,
    determine that the web application is subscribed to receive the event notification, and
    provide, in a case where the web application is subscribed to receive the event notification, the indication of the event notification to the application via the event page,
  wherein one or more other applications associated with the corresponding user are authorized to receive the event notification based on a match between the identifier associated with the corresponding user and at least a portion of the event notification.

* * * * *